(12) United States Patent
Fujiki et al.

(10) Patent No.: US 8,520,330 B2
(45) Date of Patent: Aug. 27, 2013

(54) LENS BARREL PART, LENS ASSEMBLY, IMAGING DEVICE, AND LENS BARREL PART MANUFACTURING METHOD

(75) Inventors: Kouei Fujiki, Saitama (JP); Ryota Sasaki, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/699,973

(22) PCT Filed: May 2, 2011

(86) PCT No.: PCT/JP2011/060517
§ 371 (c)(1),
(2), (4) Date: Nov. 28, 2012

(87) PCT Pub. No.: WO2011/148762
PCT Pub. Date: Dec. 1, 2011

(65) Prior Publication Data
US 2013/0070351 A1    Mar. 21, 2013

(30) Foreign Application Priority Data
May 27, 2010    (JP) .................................. 2010-121573

(51) Int. Cl.
G02B 7/02         (2006.01)
(52) U.S. Cl.
USPC ............................ 359/830; 359/811; 359/819
(58) Field of Classification Search
USPC ......... 359/811, 819, 830; 396/529; 348/335; 264/162
See application file for complete search history.

(56) References Cited

U.S. PATENT DOCUMENTS

| 4,806,257 | A | 2/1989 | Clark et al. |
| 5,817,245 | A | 10/1998 | Iwamoto et al. |
| 8,023,211 | B2 * | 9/2011 | Sasaki et al. ................... 359/822 |
| 8,025,450 | B2 * | 9/2011 | Taki et al. ...................... 396/529 |
| 2003/0136057 | A1 | 7/2003 | Hirao et al. |
| 2007/0191209 | A1 | 8/2007 | Hyuga et al. |
| 2010/0079876 | A1 | 4/2010 | Tanaka et al. |
| 2010/0080552 | A1 | 4/2010 | Taki et al. |

FOREIGN PATENT DOCUMENTS

| JP | 8-276356 | 10/1996 |
| JP | 2003-145416 | 5/2003 |
| JP | 2006-284991 | 10/2006 |
| JP | 2006-292927 | 10/2006 |

(Continued)

OTHER PUBLICATIONS

Extended European Search Report dated Mar. 15, 2013 from the European Patent Office in European Patent Application No. 11786462.9, 9 pages.

(Continued)

Primary Examiner — Loha Ben
(74) Attorney, Agent, or Firm — Young & Thompson

(57) ABSTRACT

Provided are a lens barrel part and a method of producing the same, such that the generation of grinding debris due to friction with lenses is suppressed while maintaining the air permeability of porous ceramics. Those areas of a lens barrel part 1 which are in contact with the lenses are ground in the water by a polishing tool 25, with the result that in those regions of surfaces in contact with the lenses where fine projections exist, protection film portions 28 consisting of hydrates or oxides are created due to the generation of tribo-chemical reactions, and that in those regions of surfaces in contact with the lenses which are other than the regions where fine projections are present, there exist porous portions 29 where no tribochemical reaction occurs and where a porous state remains.

10 Claims, 5 Drawing Sheets

(56) References Cited

FOREIGN PATENT DOCUMENTS

| | | |
|---|---|---|
| JP | 2007-238430 | 9/2007 |
| JP | 2007-279557 | 10/2007 |
| JP | 2009-248251 | 10/2009 |
| JP | 2010-085719 | 4/2010 |

OTHER PUBLICATIONS

International Search Report, PCT/JP2011/060517, May 31, 2011.

* cited by examiner

30 μm

LENS BARREL PART, LENS ASSEMBLY, IMAGING DEVICE, AND LENS BARREL PART MANUFACTURING METHOD

TECHNICAL FIELD

The present invention relates to a lens barrel part into which lenses are incorporated and a method of producing the same and particularly to a lens barrel part made of porous ceramic and a method of producing the same. The present invention also relates to a lens assembly and an imaging device provided with such lens barrel part.

BACKGROUND ART

Imaging devices used in, for example, portable telephones and automobiles are required to have excellent performance stability and durability at high and low temperatures, and other harsh environmental conditions. Accordingly, Patent Literatures 1 and 2, for example, propose using a ceramic lens barrel. Patent Literature 3 proposes using porous ceramic excelling in air permeability and durability for optical parts.

A lens barrel part generally comprises, as described in, for example, Patent Literature 4, a lens barrel body containing a plurality of lenses, spacing rings for defining the distances between the lenses in the lens barrel body, and a holder ring provided at an end of the lens barrel body. The lenses incorporated in the lens barrel part are in contact with the lens barrel body and thus secured to ensure that the optical axes and focal points of the lenses remain in alignment. On the other hand, a lens barrel part of porous ceramic generally has fine asperities on the surfaces thereof. Therefore, a problem may arise that when, for example, lenses are placed in the lens barrel part, the friction between lenses and the part produces grinding debris from the lens barrel part.

On the other hand, Patent Literature 5, for example, proposes coating the whole surface of a ceramic with a protection film by tribochemical reaction to smooth the surface.

CITATION LIST

Patent Literature

Patent Document 1: JP 2006-284991 A
Patent Document 2: JP 2006-292927 A
Patent Document 3: JP 2007-238430 A
Patent Document 4: JP 2007-279557 A
Patent Document 5: JP 2003-145416 A

SUMMARY OF THE INVENTION

Technical Problems

However, coating the whole surface of a lens barrel part to smooth out the asperities of the surface restricts air permeability and hence increases the temperature difference between inside and outside of a lens assembly where lenses are incorporated in the lens barrel part, causing moisture to form on the inside thereof.

The present invention has been made in order to solve the above problems in the art and has an object of providing a lens barrel part and a method of producing the same wherein the air permeability of porous ceramic is maintained while generation of grinding debris due to friction with the lenses is restrained.

The present invention also has an object of providing a lens assembly and an imaging device comprising such a lens barrel part.

Solution to Problems

To achieve the above objects, a lens barrel part according to the present invention is a lens barrel part made of porous ceramic with lens contact surfaces, wherein the lens contact surfaces including: protection film portions made of a hydrate or an oxide generated in a tribochemical reaction caused by polishing the lens contact surfaces with a polishing tool in water; and porous portions that are not subjected to the tribochemical reaction and therefore remain porous.

The protection film portions preferably have a surface area of 20% to 80% of the lens contact surfaces.

The protection film portions may be generated by polishing the lens contact surfaces with the polishing tool having a surface roughness of 3 μm or less.

The lens barrel part is preferably made of silicon nitride.

The lens barrel part comprises a lens barrel body containing a plurality of lenses, at least one spacing ring for defining spacings between the lenses in the lens barrel body, and a holder ring located at an end of the lens barrel body, wherein each of lens contact surfaces of the lens barrel body, the at least one spacing ring, and the holder ring may have the protection film portions and the porous portions.

A lens assembly of the invention has lenses incorporated in the above-mentioned lens barrel part.

The imaging device of the invention comprises the lens assembly described above.

A method of producing a lens barrel part according to the invention is a method of producing a lens barrel part made of porous ceramic with lens contact surfaces, the method comprising polishing the lens contact surfaces with a polishing tool in water and thereby, in fine projection areas of the lens contact surfaces, inducing a tribochemical reaction caused by friction heat that accompanies the polishing to generate protection film portions made of a hydrate or an oxide, while in other areas than the fine projection areas of the lens contact surfaces, inducing no tribochemical reaction to allow the other areas to be porous portions remaining porous.

The polishing tool may have a smaller surface roughness than those of the lens contact surfaces.

The polishing tool may have a surface roughness of 3 μm or less.

Advantageous Effects of Invention

The present invention enables the air permeability of porous ceramic to be maintained while generation of grinding debris due to friction with lenses is restrained.

DESCRIPTION OF EMBODIMENTS

The present invention is described in detail below with reference to preferred embodiments illustrated in the attached drawings.

Figure 1:
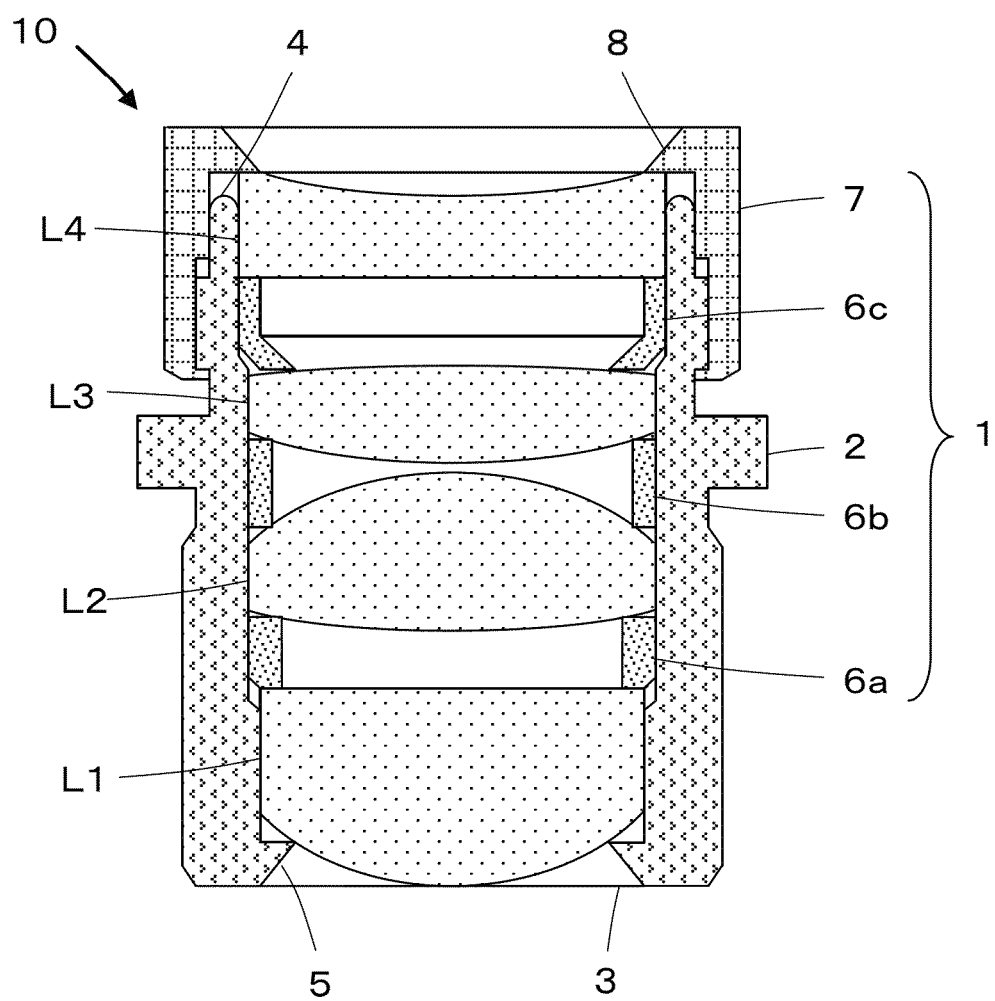
FIG. 1 is a cross sectional view illustrating a configuration of a lens barrel part according to an embodiment of the invention.

FIG. 1 illustrates a lens assembly 10 wherein four lenses L1 to L4 are incorporated in a lens barrel part 1. The lens barrel part 1 comprises a lens barrel body 2 housing the lenses L1 to L4 in this order, spacing rings 6a to 6c defining the distances between the lenses L1 to L4 in the lens barrel body 2, and a holder ring 7 provided on the outer periphery of the front end of the lens barrel body 2.

The lens barrel body 2 has the shape of a hollow cylinder with open ends, with a rear end opening 3 on the rear end (image forming side) and a front end opening 4 on the front end (side closer to a subject). The lens barrel body 2 has a configuration such that the inner periphery of the rear end portion is in contact with the outer periphery of the lens L1, the inner periphery of the middle portion is in contact with the outer periphery of the lenses L2 and L3, and the inner periphery of the front end portion is in contact with the outer periphery of the lens L4. The lenses L2 and L3 have a larger diameter than the lens L1, and the lens L4 has a larger diameter than the lenses L2 and L3. Accordingly, the rear end portion, the middle portion, and the front end portion of the lens barrel body 2 have different inner diameters and are formed concentrically to align the optical axes of the lenses L1 to L4.

The rear end opening 3 of the lens barrel body 2 has a rim ridge 5 having a smaller inner diameter than the diameter of the lens L1 and supporting the lens L1 from behind the lens L1. The front end opening 4 of the lens barrel body 2 has an inner diameter corresponding to the diameter of the lens L4 and is so formed as to allow sequential insertion of the lenses L1 to L4.

The spacing rings 6a to 6c are inserted between the lenses L1 to L4 incorporated in the lens barrel body 2. The spacing rings 6a to 6c have an annular shape, and the outer peripheries thereof are in contact with the inner periphery of the lens barrel body 2.

The rear and the front surfaces of the spacing ring 6a are in contact with the lenses L1 and L2 respectively to define the spacing between them. The rear and the front surfaces of the spacing ring 6b are in contact with the lenses L2 and L3 respectively to define the spacing between them. The rear and the front surfaces of the spacing ring 6c are in contact with the lenses L3 and L4 respectively to define the spacings between them.

On the outer periphery of the front end of the lens barrel body 2, there is provided the holder ring 7 having a cylindrical shape. The front end portion of the holder ring 7 has a rim ridge 8 having a smaller inner diameter than the diameter of the lens L4 and securing the lens L4 from the front side of the lens L4. The holder ring 7 is secured to the lens barrel body 2 by, for example, threaded or fitted engagement.

The lens barrel part 1 (lens barrel body 2, spacing rings 6a to 6c, and holder ring 7) are made of porous ceramic such as, for example, silicon nitride and have lens contact surfaces including the inner periphery of the lens barrel body 2 in contact with the outer peripheries of the lenses L1 to L4, the front and the rear surfaces of the spacing rings 6a to 6c in contact with the front and the rear surfaces of the lenses L1 to L4, the rim ridge 5 of the lens barrel body 2, and the rim ridge 8 of the holder ring 7. Porous ceramic herein is ceramic having a porosity of 10% or more.

Figure 2:
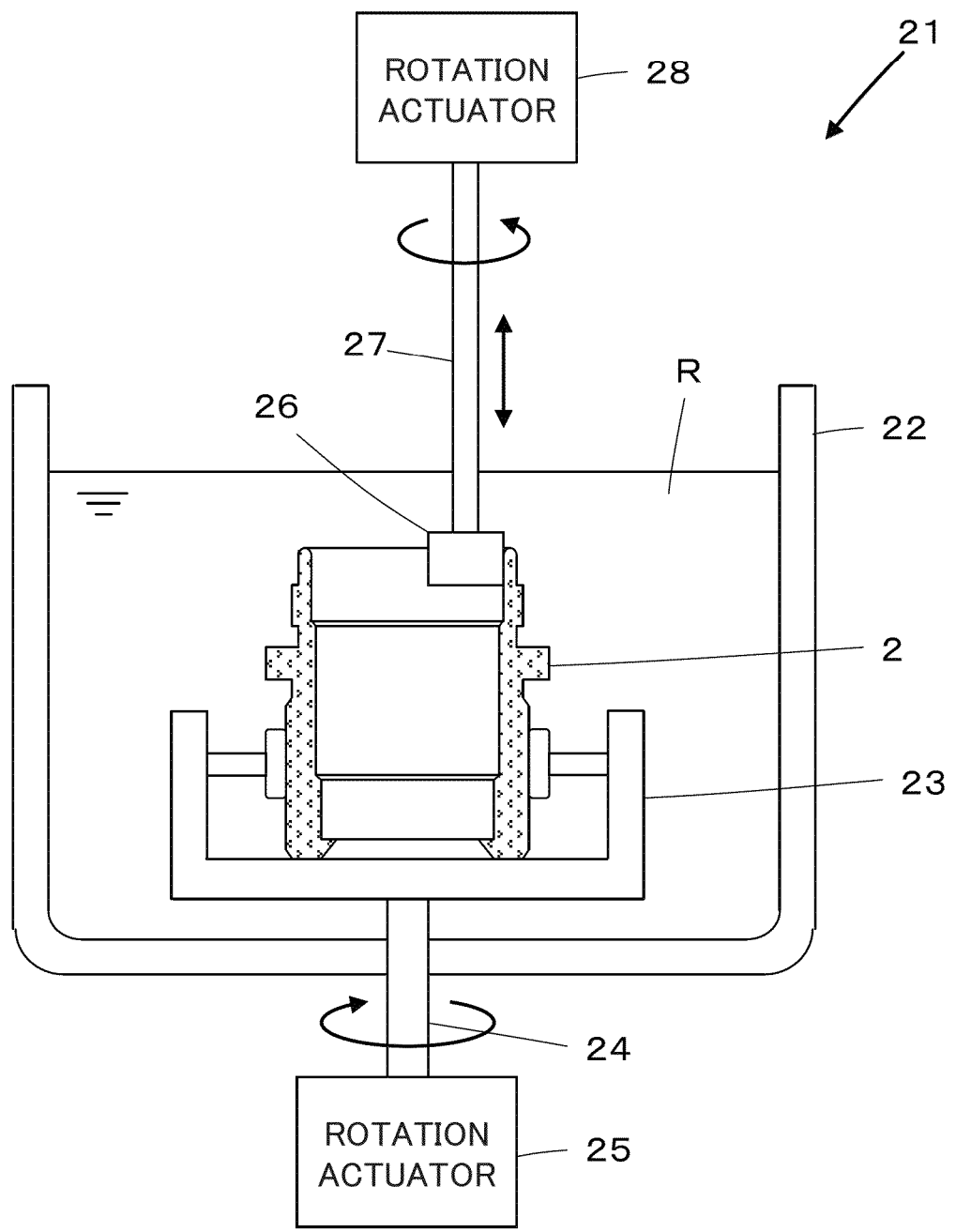
FIG. 2 is a cross sectional view illustrating a configuration of a protection film producing device.

FIG. 2 illustrates a configuration of the protection film producing device 21 for forming protection film portions on the lens contact surfaces of the lens barrel part 1. The protection film producing device 21 comprises a tank 22 storing a reaction liquid R such as water for causing a tribochemical reaction.

In the reaction liquid R in the tank 22, there is provided a member fastener means 23 for fastening the lens barrel body 2. The member fastener means 23 is connected via a drive shaft 24 to a rotation actuator 25 for turning the member fastener means 23 at a given rotation speed in a given direction. In the reaction liquid R in the tank 22, there is provided a polishing tool 26 for polishing the lens contact surfaces of the lens barrel body 2. The polishing tool 26 is made of, for example, ceramic or metal having a higher hardness than the lens barrel body 2. The surface roughness of the polishing tool 26 is smaller than those of the lens contact surfaces of the lens barrel body 2 and may be, for example, 3 μm or less. The polishing tool 26 is connected via a drive shaft 27 to a rotation actuator 28. The rotation actuator 28 moves the polishing tool 26 vertically and turns it at a given speed in the opposite direction to the rotation direction of the member fastener means 23.

First, after the lens barrel body 2 is secured to the member fastener means 23 in the tank 22, the reaction liquid R is supplied into the tank 22 so that the lens barrel body 2 is filled therewith. The polishing tool 26 is positioned so as to be in contact with the lens contact surfaces of the lens barrel body 2, then the rotation actuator 25 turns the member fastener means 23 at a given speed whereas the rotation actuator 28 turns the polishing tool 26 at a given speed in the opposite direction to the rotation direction of the member fastener means 23. Thus, the lens contact surfaces of the lens barrel body 2 made of silicon nitride are polished by the polishing tool 26 in the reaction liquid. Friction heat generated by polishing causes a tribochemical reaction whereby silicon generated on the surface of the lens barrel body 2 reacts with the surrounding reaction liquid R to produce a protection film made of a hydrate (Si—OH) and an oxide (Si—O).

The polishing tool 26, having a smaller surface roughness than the lens contact surfaces of the lens barrel body 2, grinds only the projections of the fine asperities of the lens barrel body 2. Therefore, the protection film is generated only with fine projections of the lens barrel body 2. The protection film generated is crushed by the polishing tool 26 to form smoothed-out protection film portions in given areas of fine projections. Thus, the fine projection areas of the lens barrel body 2 can be smoothed out. The other areas than the fine projection areas of the lens barrel body 2, free from tribochemical reaction, are porous portions made of silicon nitride remaining porous. Since the porosity remains, the lens barrel body 2 has air permeability as well.

Moving the polishing tool 26 over the lens contact surfaces of the lens barrel body 2 vertically and turning the member fastener means 23 about the drive shaft 24 enable lens contact surfaces having protection film portions and porous portions to be obtained over the whole inner periphery of the lens barrel body 2.

Likewise, causing a tribochemical reaction on the lens contact surfaces of the spacing rings 6a to 6c and the holder ring 7 using a polishing tool having a smaller surface roughness than the lens contact surfaces makes it possible to obtain lens contact surfaces on the spacing rings 6a to 6c and the holder ring 7 wherein protection film portions are generated in fine projection areas while the other areas than the fine projection areas are porous portions.

Figure 3:
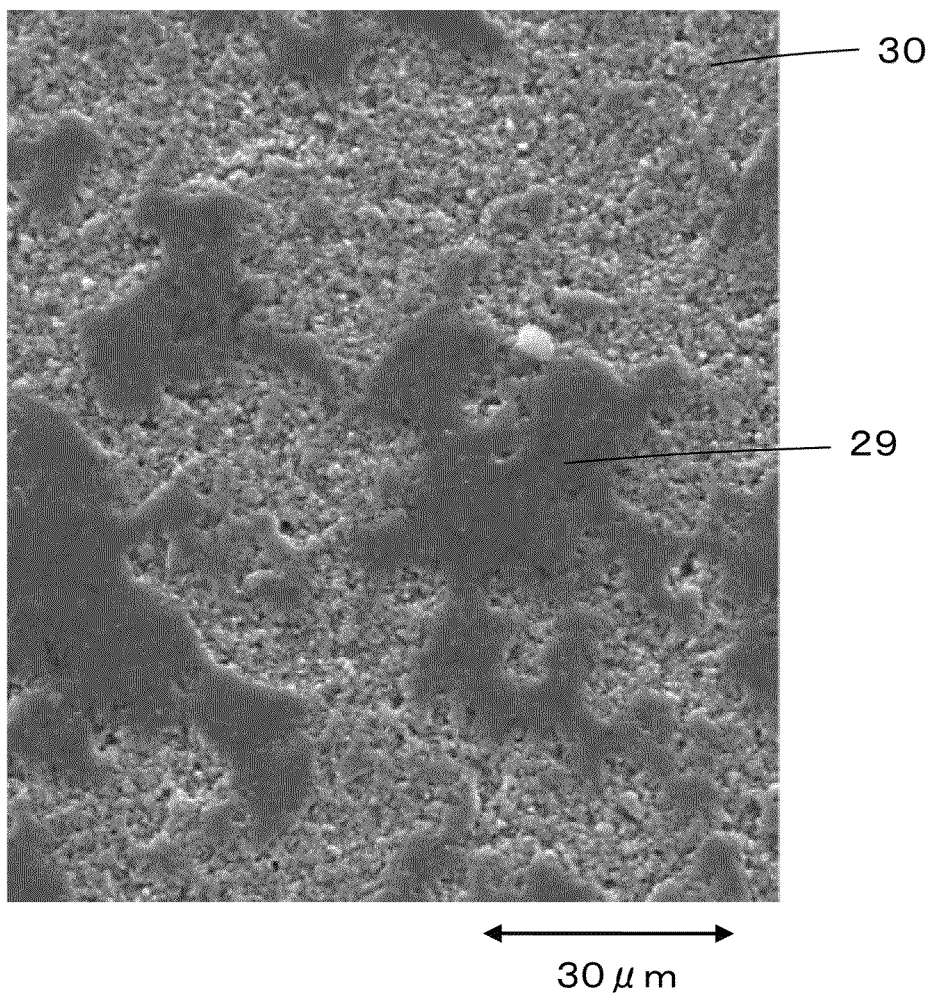
FIG. 3 is an enlarged view of a lens barrel part where protection film portions have been formed by the protection film producing device.

FIG. 3 shows a photograph of a lens contact surface of the lens barrel part 1 having protection film portions 29 and porous portions 30. The photograph shows protection film portions formed on a lens contact surface of the lens barrel part 1 using the protection film producing device 21 enlarged under a scanning electron microscope at a magnification of 1000 times. Thus, protection film portions are produced in the porous areas formed with fine projections, and the other areas than the fine projection areas are porous portions remaining porous.

The ratio in surface area of the protection film portions 29 to the lens contact surfaces of the lens barrel part 1 can be controlled depending on the surface roughness of the polishing tool 26, a higher ratio is obtained with the polishing tool 26 having a larger surface roughness, and a lower ratio with the polishing tool 26 having a smaller surface roughness. To restrain generation of grinding debris while maintaining air permeability of the lens barrel part 1, it is desirable to provide protection film portions 29 having a surface area of preferably 20% to 80% of the lens contact surfaces.

Next, a description will be made to explain how the lens assembly 10 illustrated in FIG. 1 is completed using the lens barrel body 2 where the lens contact surfaces are formed with protection film portions and porous portions, the spacing rings 6a to 6c, and the holder ring 7.

Figure 4:
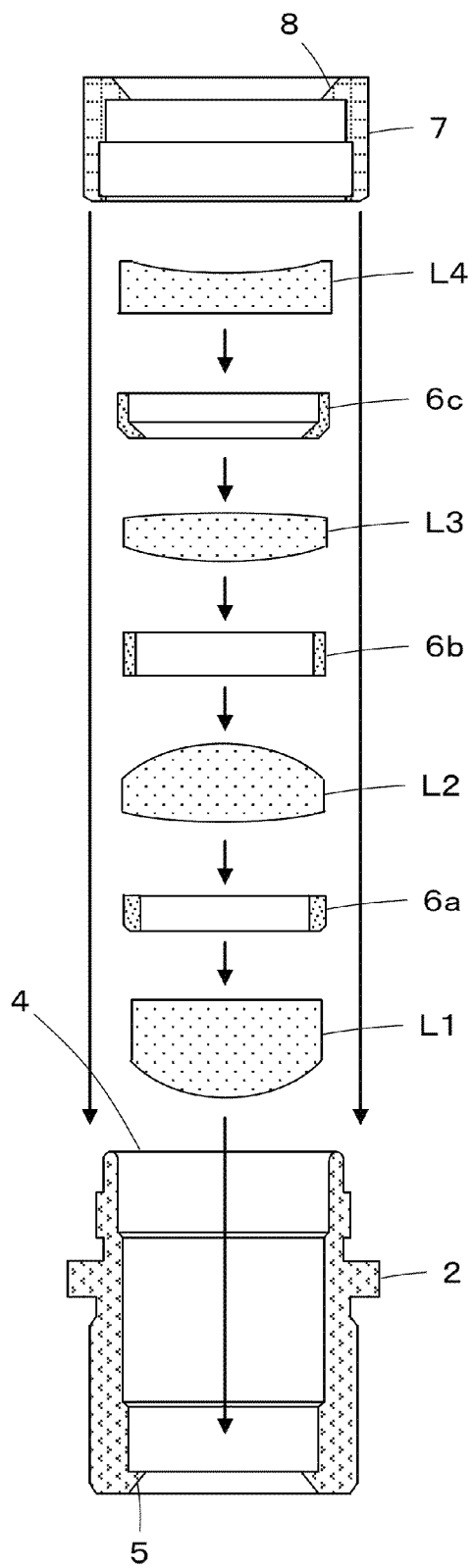
FIG. 4 is a cross sectional view showing how a lens assembly is completed.

First, as illustrated in FIG. 4, the lens L1 is inserted from the front end opening 4 of the lens barrel body 2 and moved, with the outer periphery of the lens L1 kept in contact with the protection film portions formed on the inner periphery of the lens barrel body 2 at a given ratio, until the rear surface of the lens L1 comes into contact with the rim ridge 5 of the lens barrel body 2. Protection film portions are also formed on the rim ridge 5 at a given ratio and the rim ridge 5 is in contact with the rear surface of the lens L1 through the protection film portions. Next, the spacing ring 6a is inserted from the front end opening 4 of the lens barrel body 2 and moved, with the outer periphery of the spacing ring 6a kept in contact with the protection film portions formed on the inner periphery of the lens barrel body 2, until the rear surface of the spacing ring 6a comes into contact with the front surface of the lens L1. The spacing ring 6a is now in contact with the lens L1 through the protection film portions formed at a given ratio on the rear surface thereof. Likewise, the lens L2, the spacing ring 6b, the lens L3, the spacing ring 6c, and the lens L4 are sequentially inserted from the front end opening 4 of the lens barrel body 2 and moved until the front surface of the spacing ring 6a and the rear surface of the spacing ring 6b come into contact with the lens L2, the front surface of the spacing ring 6b and the rear surface of the spacing ring 6c come into contact with the lens L3, and the front surface of the spacing ring 6c comes into contact with the lens L4. In the above process also, the spacing rings 6b and 6c are moved, with the outer peripheries thereof kept in contact with the protection film portions formed on the inner periphery of the lens barrel body 2, and are now in contact with the lenses L2 to L4 through the protection film portions formed at a given ratio on the rear and the front surfaces.

Because, as described above, the lenses L1 to L4 are moved while kept in contact with the smoothed protection film portions of the lens barrel body 2, generation of grinding debris caused by the friction between the lenses L1 to L4 and the porous portions of the lens barrel body 2 can be prevented. Likewise, because the smoothed protection film portions of the spacing rings 6a to 6c are in contact with the lenses L1 to L4, generation of grinding debris caused by the friction between the porous portions of the spacing rings 6a to 6c and the lenses L1 to L4 can be prevented.

When the lenses L1 to L4 have been contained in the lens barrel body 2, the holder ring 7 is mounted at the front end portion of the lens barrel body 2, and the rim ridge 8 of the holder ring 7 holds the lens L4 from the front side thereof, so that the lens barrel body 2 and the holder ring 7 are secured to each other. Thus, the lenses L1 to L4 are sandwiched between the rim ridge 5 of the lens barrel body 2 and the rim ridge 8 of the holder ring 7, and the space defined by the lens barrel body 2, the lens L1, and the lens L4 is closed to complete the lens assembly 10.

Because the rim ridge 8 of the holder ring 7 is in contact with the lens L4 through the protection film portions formed at a given ratio, generation of grinding debris caused by the friction between the porous portions of the holder ring 7 and the lens L4 can be prevented.

According to this embodiment, because the lens contact surfaces of the lens barrel part 1 comprise the protection film portions and the porous portions at a given ratio, generation of grinding debris caused by the friction between the porous portions of the lens barrel part 1 and the lenses L1 to L4 can be prevented with maintaining the air permeability of the lens barrel part 1. Further, even after the lenses L1 to L4 are installed in the lens barrel part 1, because the lens contact surfaces of the lens barrel part 1 remain in contact with the lenses L1 to L4 through the protection film portions, generation of grinding debris caused by vibration and movement can be prevented, and because the air permeability is maintained by the porous portions, the temperature difference that might arise between inside and outside from the airtightness can be reduced.

Figure 5:
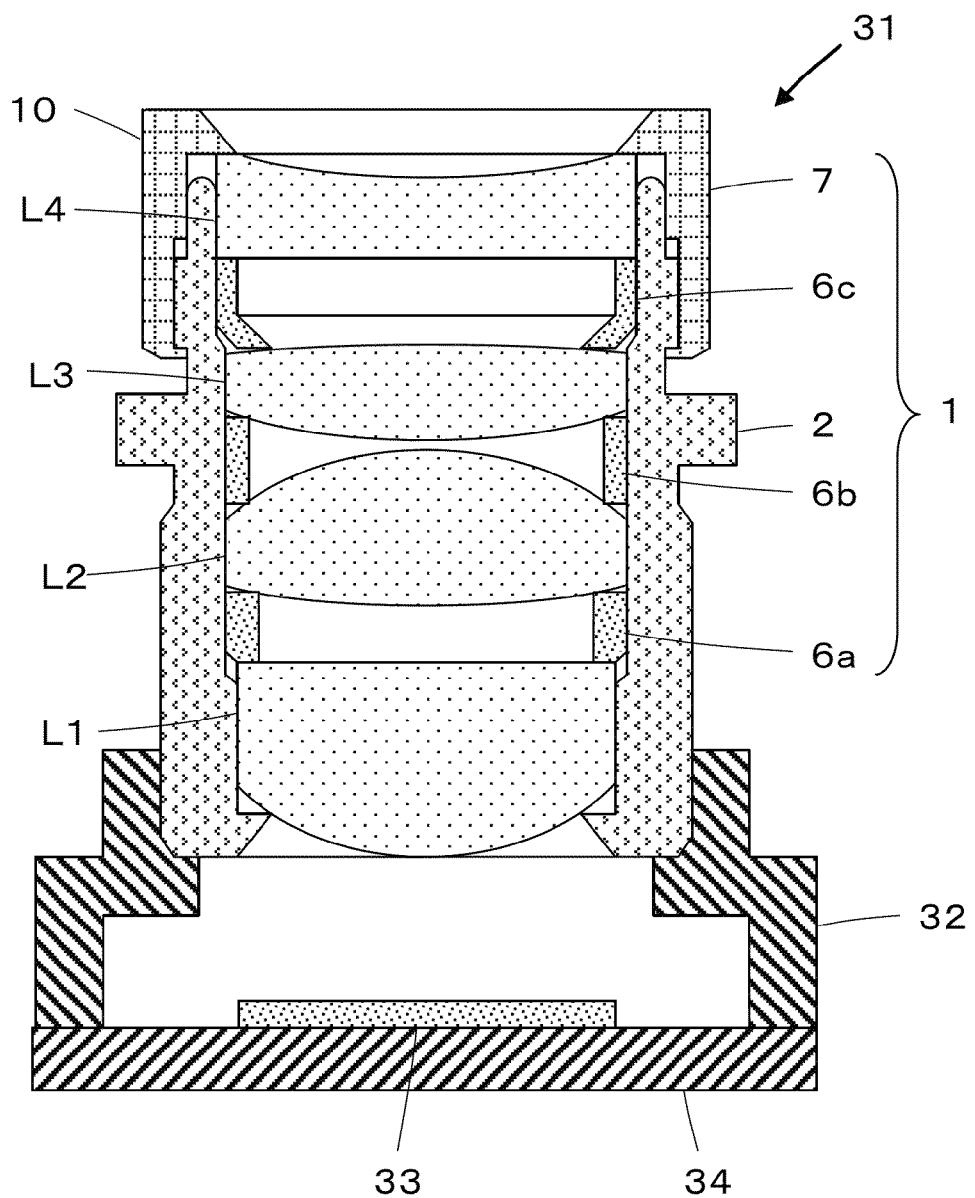
FIG. 5 is a cross sectional view illustrating a configuration of an imaging device.

The lens assembly 10 thus constructed may be combined with, for example, an image sensor, to configure an imaging device. As illustrated in FIG. 5, for example, an imaging device 31 may be assembled by bonding and securing a camera body frame 32 having a cylindrical shape to the rear end portion of the lens barrel body 2 of the lens assembly 10 and bonding and securing a board 34 having an image sensor 33 and other components mounted thereon to the rear end side of the camera body frame 32.

In this embodiment, the protection film portions are provided only on the lens contact surfaces of the lens barrel part 1. However, the protection film portions may also be provided at a given ratio on areas, such as the outer peripheries of the spacing rings 6a to 6c that come into contact with the lens barrel body 2, where grinding debris are generated as porous portions are ground.

The lens barrel part 1 is essentially required to be capable of causing a tribochemical reaction to generate the protection film portions and may be made of, for example, a substance containing silicon such as silicon nitride or silicon carbide.

The spacing rings 6a to 6c are essentially required to be capable of defining the spacings between the lenses L1 to L4, and their outer peripheries need not necessarily be in contact with the inner periphery of the lens barrel body 2.

The polishing of the lens barrel part 1 implemented with the protection film producing device 21 is essentially required to be capable of generating the protection film portions through a tribochemical reaction caused by friction heat accompanying the polishing in the fine projection areas of the lens barrel part 1 and may be achieved through, for example, barrel polishing using a polishing tool such as ceramic balls.

The lenses incorporated in the lens barrel part 1 are essentially required to be capable of forming an image by the light traveling from a subject and need not necessarily be four lenses such as L1 to L4.

REFERENCE SIGNS LIST 1 lens barrel part, 2 lens barrel body, 3 rear end opening, 4 front end opening, 5 rim ridge, 6a to 6c spacing rings, 7 holder ring, 8 rim ridge, 10 lens assembly, 21 protection film producing device, 22 tank, 23 member fastener means, 24, 27 actuator shafts, 25, 28 rotation actuators, 26 polishing tool, 29 protection film portions, 30 porous portions, 31 imaging device, 32 camera body frame, 33 image sensor, L1 to L4 lenses, R reaction liquid.

The invention claimed is:

1. A lens barrel part made of porous ceramic with lens contact surfaces,
wherein the lens contact surfaces include:
protection film portions made of a hydrate or an oxide generated in a tribochemical reaction caused by polishing the lens contact surfaces with a polishing tool in water; and
porous portions that are not subjected to the tribochemical reaction and remain porous.

2. The lens barrel part according to claim 1, wherein the protection film portions have a surface area of 20% to 80% of the lens contact surfaces.

3. The lens barrel part according to claim 1, wherein the protection film portions are generated by polishing the lens contact surfaces with the polishing tool having a surface roughness of 3 μm or less.

4. The lens barrel part according to claim 1 made of silicon nitride.

5. The lens barrel part according to claim 1, comprising: a lens barrel body containing a plurality of lenses; at least one spacing ring for defining at least one spacing between the lenses in the lens barrel body; and a holder ring located at an end of the lens barrel body, wherein each of lens contact surfaces of the lens barrel body, the at least one spacing ring, and the holder ring has the protection film portions and the porous portions.

6. A lens assembly comprising the lens barrel part as claimed in claim 1 having lenses incorporated therein.

7. An imaging device comprising the lens assembly as claimed in claim 6.

8. A method of producing a lens barrel part made of porous ceramic with lens contact surfaces, the method comprising: polishing the lens contact surfaces with a polishing tool in water and thereby, in fine projection areas of the lens contact surfaces; and inducing a tribochemical reaction caused by friction heat that accompanies the polishing to generate protection film portions made of a hydrate or an oxide, while in other areas than the fine projection areas of the lens contact surfaces, inducing no tribochemical reaction to allow the other areas to be porous portions remaining porous.

9. The method of producing a lens barrel part according to claim 8, wherein the polishing tool has a smaller surface roughness than those of the lens contact surfaces.

10. The method of producing a lens barrel part according to claim 9, wherein the polishing tool has a surface roughness of 3 μm or less.

* * * * *